United States Patent
Dieckmann et al.

(10) Patent No.: US 10,717,477 B2
(45) Date of Patent: Jul. 21, 2020

(54) REAR SPOILER DEVICE FOR A VEHICLE

(71) Applicant: WABCO Europe BVBA, Brussels (BE)

(72) Inventors: Thomas Dieckmann, Pattensen (DE); Dalibor Dohnal, Zlin (CZ); Umut Gencaslan, Hannover (DE); Miroslav Kadlec, Zlin (CZ); Zdenek Rajch, Zlin (CZ); Luis Carlos Ramirez Alvarez, Voorburg (NL); Tomàs Vaculik, Zlin (CZ); Gandert Marcel Rita Van Raemdonck, Delft (NL); Hjalmar Luc Maria Van Raemdonck, Brasschaat (BE)

(73) Assignee: WABCO Europe BVBA, Brussels (BE)

( * ) Notice: Subject to any disclaimer, the term of this patent is extended or adjusted under 35 U.S.C. 154(b) by 0 days.

(21) Appl. No.: 15/513,412

(22) PCT Filed: Aug. 26, 2015

(86) PCT No.: PCT/EP2015/001736
§ 371 (c)(1),
(2) Date: Mar. 22, 2017

(87) PCT Pub. No.: WO2016/045767
PCT Pub. Date: Mar. 31, 2016

(65) Prior Publication Data
US 2017/0334491 A1    Nov. 23, 2017

(30) Foreign Application Priority Data
Sep. 23, 2014   (DE) .................. 10 2014 113 780

(51) Int. Cl.
*B60J 9/00* (2006.01)
*B62D 35/00* (2006.01)
*B62D 63/08* (2006.01)

(52) U.S. Cl.
CPC ......... *B62D 35/001* (2013.01); *B62D 35/007* (2013.01); *B62D 63/08* (2013.01)

(58) Field of Classification Search
CPC .. B62D 35/007; B62D 35/001; B62D 35/005; B62D 37/02; Y10S 180/903; B60J 7/0435; B60J 7/22
See application file for complete search history.

(56) References Cited

U.S. PATENT DOCUMENTS 4,682,808 A    7/1987  Bilanin
4,741,569 A *  5/1988  Sutphen ............... B62D 35/004
                                            296/180.4

(Continued)

FOREIGN PATENT DOCUMENTS

DE          10228658 A1    1/2004
DE      202009015009 U1    1/2010

(Continued)

OTHER PUBLICATIONS

PCT/EP2015/001736 International Search Report dated Nov. 25, 2015, 3 pages.

(Continued)

*Primary Examiner* — Kiran B Patel
(74) *Attorney, Agent, or Firm* — Warner Norcross + Judd LLP

(57) ABSTRACT

A rear spoiler device (8) for a vehicle comprises an air-guiding element (9, 19), which can be moved between a retracted base position and a driving position and has a guiding surface (9d) for aerodynamically extending the contour of an exterior surface (4, 3) of the vehicle in the driving position. The air-guiding element (9) has a contact edge (9c) extending in a lateral direction (y) for contacting the exterior surface (4) of the vehicle (1) in the driving position, wherein the rear spoiler device (8) can be mounted (Continued)

completely on a rear door of the vehicle, the air-guiding element (9, 19) being designed in a multi-layer manner.

21 Claims, 6 Drawing Sheets

(56) References Cited

U.S. PATENT DOCUMENTS

| | | | | |
|---|---|---|---|---|
| 4,818,015 A * | 4/1989 | Scanlon | B62D 35/001 296/180.1 |
| 5,498,059 A * | 3/1996 | Switlik | B62D 35/001 296/180.1 |
| 6,092,861 A * | 7/2000 | Whelan | B62D 35/001 296/180.2 |
| 6,257,654 B1 * | 7/2001 | Boivin | B62D 35/001 296/180.4 |
| 6,309,010 B1 * | 10/2001 | Whitten | B62D 35/001 296/180.1 |
| 6,485,087 B1 * | 11/2002 | Roberge | B62D 35/001 296/180.4 |
| 6,666,498 B1 * | 12/2003 | Whitten | B62D 35/001 296/180.1 |
| 7,008,004 B2 * | 3/2006 | Ortega | B62D 35/004 105/1.1 |
| 7,537,270 B2 | 5/2009 | O'Grady | |
| 7,618,086 B2 * | 11/2009 | Breidenbach | B62D 35/007 296/180.4 |
| 8,100,461 B2 * | 1/2012 | Smith | B62D 35/001 296/180.4 |
| 8,672,391 B1 * | 3/2014 | Cobb | B62D 35/001 296/180.4 |
| 9,051,013 B1 * | 6/2015 | Popa | B62D 35/004 |
| 9,333,993 B2 * | 5/2016 | Telnack | B62D 35/007 |
| 9,505,449 B2 * | 11/2016 | Telnack | B62D 35/001 |
| 9,522,706 B1 * | 12/2016 | Breidenbach | B62D 37/02 |
| 9,555,841 B1 * | 1/2017 | Roush | B62D 35/001 |
| 9,616,944 B2 * | 4/2017 | Baker | B62D 35/001 |
| 9,650,086 B1 * | 5/2017 | Pfaff | B62D 35/001 |
| 9,663,156 B2 * | 5/2017 | Breidenbach | B62D 35/001 |
| 9,708,017 B1 * | 7/2017 | Regan | B62D 35/002 |
| 9,776,674 B2 * | 10/2017 | Baker | B62D 35/007 |
| 9,834,262 B2 * | 12/2017 | Baker | B62D 35/001 |
| 9,950,752 B2 * | 4/2018 | Baker | B62D 35/001 |
| 10,059,384 B2 * | 8/2018 | Telnack | B62D 35/007 |
| 2003/0227194 A1 * | 12/2003 | Farlow | B62D 35/001 296/180.4 |
| 2004/0119319 A1 * | 6/2004 | Reiman | B62D 35/001 296/180.1 |
| 2007/0126261 A1 | 6/2007 | Breidenbach | |
| 2008/0048468 A1 * | 2/2008 | Holubar | B62D 35/001 296/180.4 |
| 2009/0096250 A1 * | 4/2009 | Kohls | B62D 35/001 296/180.4 |
| 2009/0179456 A1 * | 7/2009 | Holubar | B62D 35/001 296/180.4 |
| 2009/0200834 A1 * | 8/2009 | Vogel | B62D 35/001 296/180.3 |
| 2011/0037291 A1 * | 2/2011 | Pickering | B62D 35/001 296/180.4 |
| 2011/0084516 A1 * | 4/2011 | Smith | B62D 35/001 296/180.4 |
| 2011/0221231 A1 * | 9/2011 | Visser | B62D 35/004 296/180.4 |
| 2013/0106136 A1 * | 5/2013 | Smith | B62D 35/001 296/180.4 |
| 2014/0117713 A1 * | 5/2014 | Baker | B62D 35/001 296/180.4 |
| 2014/0367993 A1 * | 12/2014 | Breidenbach | B62D 35/001 296/180.4 |
| 2015/0035312 A1 * | 2/2015 | Grandominico | B62D 35/007 296/180.4 |
| 2016/0068200 A1 * | 3/2016 | Dieckmann | B62D 35/001 296/180.4 |
| 2016/0251040 A1 * | 9/2016 | De Bock | B62D 35/007 296/180.4 |
| 2016/0304138 A1 * | 10/2016 | Dieckmann | B62D 35/007 |
| 2016/0332680 A1 * | 11/2016 | Dieckmann | B62D 35/007 |
| 2016/0347380 A1 * | 12/2016 | Dieckmann | B62D 35/007 |
| 2017/0021873 A1 * | 1/2017 | Dieckmann | B62D 35/001 |

FOREIGN PATENT DOCUMENTS

| | | |
|---|---|---|
| DE | 202009014476 U1 | 2/2010 |
| DE | 202009014510 U1 | 2/2010 |
| DE | 102009014860 A1 | 10/2010 |
| DE | 102011122292 A1 | 8/2012 |
| DE | 102012021862 A1 | 5/2013 |
| WO | WO2012174617 A1 | 12/2012 |

OTHER PUBLICATIONS

English language abstract and machine translation for DE10228658 (A1) extracted from http://worldwide.espacenet.com database on Feb. 14, 2017, 13 pages.

English language abstract for DE202009015009 (U1) extracted from https://patents.google.com and machine translation extracted from http://worldwide.espacenet.com database on Feb. 14, 2017, 13 pages.

English language abstract for DE202009014476 (U1) extracted from https://patents.google.com and machine translation extracted from http://worldwide.espacenet.com database on Feb. 14, 2017, 12 pages.

English language abstract for DE202009014510 (U1) extracted from https://patents.google.com and machine translation from http://worldwide.espacenet.com database on Feb. 14, 2017, 11 pages.

English language abstract and machine translation for DE102009014860 (A1) extracted from http://worldwide.espacenet.com database on Feb. 14, 2017, 31 pages.

English language abstract and machine translation for DE102011122292 (A1) extracted from http://worldwide.espacenet.com database on Feb. 14, 2017, 11 pages.

English language abstract and machine translation for DE102012021862 (A1) extracted from http://worldwide.espacenet.com database on Feb. 14, 2017, 14 pages.

* cited by examiner

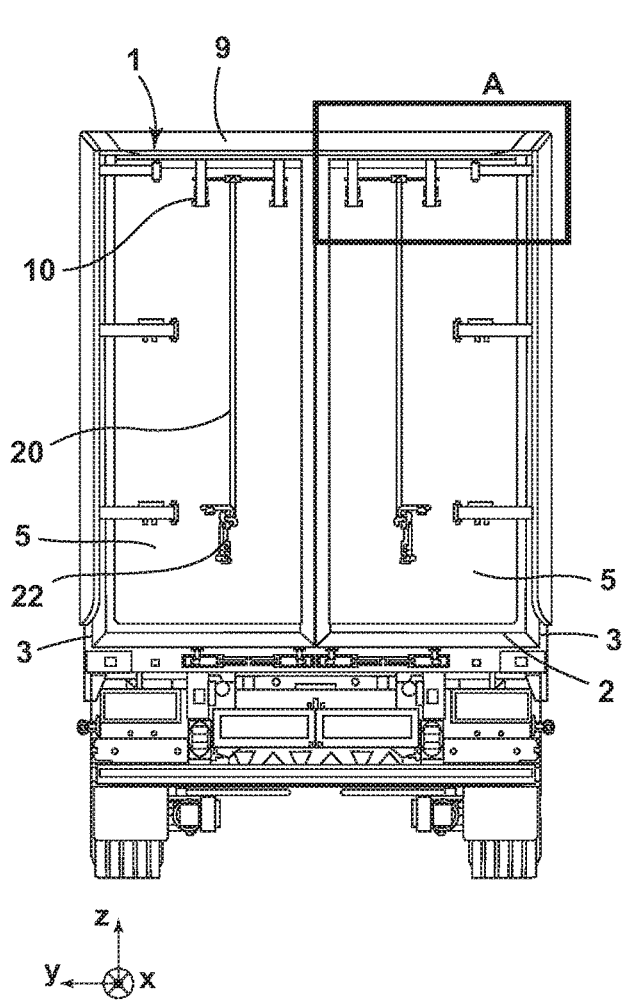
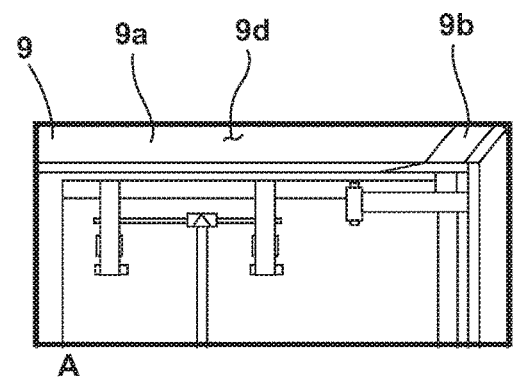
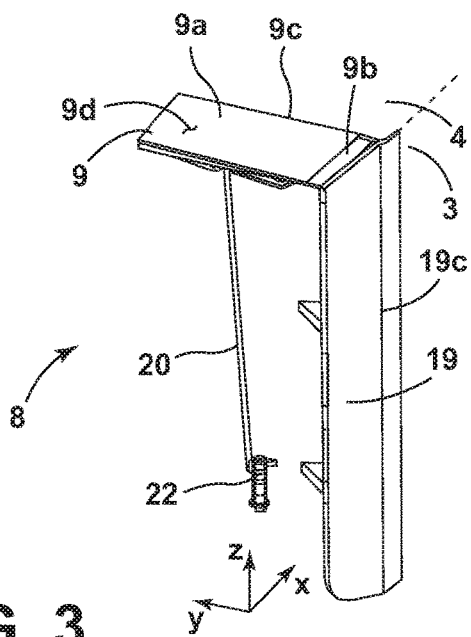
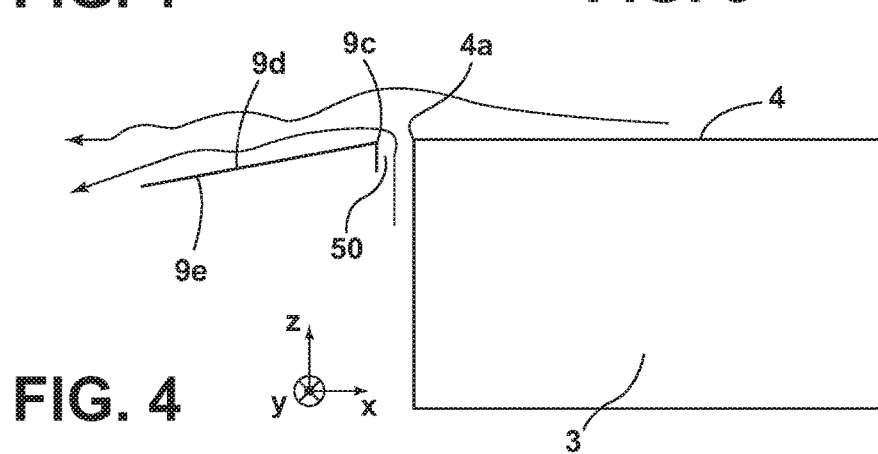
FIG. 1
FIG. 2
FIG. 3
FIG. 4

REAR SPOILER DEVICE FOR A VEHICLE

CROSS-REFERENCE TO RELATED APPLICATIONS

This application is the National Stage of International Application No. PCT/EP2015/001736, filed on 26 Aug. 2015, which claims priority to and all advantages of German Patent Application No. 10 2014 113 780.9, filed on 23 Sep. 2014, the content of which is hereby incorporated by reference.

FIELD OF THE INVENTION

The invention generally relates to a rear spoiler device and, more specifically, to a rear spoiler device for a vehicle, such as a truck, which has at least one rear door.

BACKGROUND OF THE INVENTION

Vehicles with a substantially box-like design typically comprise two side walls, a roof and a rear which closes the roof and the side walls towards the rear at an obtuse angle or substantially at right angles. The separation edge through the obtuse rear means that the aerodynamic properties are unfavorable; for this purpose, rear spoiler devices for improving these properties are known in the art.

US 2004/0119319 A1 discloses a vehicle having a rear spoiler device. The roof air-guiding elements extend the roof surface of the vehicle towards the rear and can be folded inwards. Lateral air-guiding elements are further provided, in order to extend the entire surface of the truck aerodynamically towards the rear. The adjustment device is fitted to the rear door so that it can pivot away in the retracted state with the rear door and releases the loading space. The fitting to the rear door produces a step between the vehicle structure and the front edge of the roof air-guiding elements.

In the folded-in state, however, there generally remains a bulky arrangement which projects backwards, e.g. due to the folding lines and the mechanical elements of the adjustment device. Furthermore, complete opening of the rear door through 270° to-towards the front for abutment against the side wall is also thereby prevented.

US 2007/0126261 A1 discloses a further rear spoiler device which is attached to the side walls of the vehicle and can be folded in the longitudinal direction of the vehicle; the rear spoiler device fills up the entire rear surface of the vehicle.

U.S. Pat. No. 4,682,808 B describes a rear spoiler device which is configured by a plurality of vertical and horizontal air-guiding elements which are attached to different locations of the rear region. A rear spoiler device having a roof air-guiding element is set out as the prior art, the device only being provided in an internal region and being fitted to the roof surface so that it extends backwards over the rear region; the laterally abutting surfaces are not covered by the roof air-guiding element. However, air-guiding elements of this kind are complex to mount on the roof or on the vehicle structure and do not generally allow easy opening of the rear door.

U.S. Pat. No. 7,537,270 B2 discloses a rear spoiler device having a roof air-guiding element and lateral air-guiding elements which may exhibit different formations and which are partially provided for assembly on the rear door.

A pivotable or adjustable arrangement of air-guiding elements is also further disclosed in DE 10 2009 014 860 A1, DE 20 2009 014 476 U1, DE 20 2009 014 510 U1, DE 20 2009 015 009 U1 and DE 102 286 58 A1, for example. The air-guiding elements in this case are often fitted in the hinge region, which means that specific hinge designs are required. Furthermore, the air-guiding elements that can be used are generally limited in terms of the length thereof, in particular when the rear door is intended to be pivoted forward through approximately 270°. The operation and adjustment of adjustment systems of this kind is frequently complex.

SUMMARY OF THE INVENTION

The present invention provides a rear spoiler device that can be constructed with relatively little complexity and allows secure adjustability.

The rear spoiler device comprises an air-guiding element.

The air-guiding element is flexibly elastic in a region which is external in its lateral direction, in such a manner that it is deformable in the retracted or folded-in basic position.

The lateral direction in this case is the extension direction of its abutment edge, so in the case of a roof air-guiding element, the transverse or Y direction of the vehicle and in the case of a side air-guiding element, the vertical direction or Z direction. The laterally external region lies on the outside in the lateral region, i.e. in respect of an external surface of the vehicle. In the case of a roof air-guiding element, the laterally external region is therefore the region facing the side wall.

The abutment edge typically directly abuts the external surface, having a seal where necessary in a gap that may be formed in respect of the external surface.

In the extended travel position, the air-guiding element is therefore sufficiently rigid to retain its shape for the aerodynamic contour extension. In the basic position, it particularly allows adjustments which lead to a deformation of the air-guiding element, in particular when the rear door is opened and folding forwards.

The invention is based in part on known issues concerning hinge regions of the rear door, which can be problematic when the rear door is folded forwards and when selective deformation is made possible, forward-folding is made easier. The deformation is made possible by a multi-layer configuration of the air-guiding element.

It is identified according to the invention that a layer structure of this kind exhibits advantages.

Only the upper layer exhibits the guiding surface and is therefore relevant in its formation to the aerodynamic properties.

In the multi-layer design, the at least one lower layer can therefore be selectively configured in such a manner that it influences the stiffness and deformability of the multi-layer design. Hence, an advantage can be achieved particularly through another formation, i.e. a curved formation, wherein a deformation reserve and deformability is initially made possible, so that the external region is deformable without suffering permanent damage due to the deformation, e.g. breakage or permanent deformation. Consequently, the deformation advantageously leads to a relative adjustment of the layers in respect of one another rather than material damage. The multi-layer design with the curved lower layer means that the elasticity or spring stiffness can be further increased, so that the lower layer acts as a spring element for tensioning or establishing a spring resetting force for the upper layer, for example.

During deformation of the external region, the upper layer therefore advantageously folds over in a planar manner and the lower layer folds over changing its curvature and producing a spring resetting force.

A gap between the layers in the outward lateral direction, so towards the side wall in the case of a roof air-guiding element, advantageously tapers.

On the outside edge, the roof air-guiding element can be closed off by a seal.

The curvature of the lower layer in the laterally external region advantageously extends in the longitudinal direction, i.e. from the abutment edge to the rear end. When the rear door is folded down, this curvature can then be folded down, typically in a folding plane that is automatically formed. Folding-down actions of this kind are known in the case of curved metal strips, for example, such as tape measures, for example, which exhibit a high degree of stiffness on account of their curved shape and can be folded out reversibly without damage. The upper planar layer is tilted only in a planar manner.

The two layers are typically not connected to one another in the external region, which means that the lower layer can extend in the longitudinal direction when folding down. Because the two layers are connected to one another in the internal region, a defined folding plane is also made possible just outside the frame.

Consequently, the multi-layer configuration with deformation reserve firstly means that a high elasticity and restoring force is achieved and secondly that deformability without damage is made possible, without complex or costly materials or additional devices being necessary.

Furthermore, the different layers can also each be formed using suitable materials, i.e. including different materials. Both the upper and also the lower layer are advantageously produced from plastics materials.

The external region can therefore be elastically deformed, wherein it can adapt to the side wall or the region of the vehicle structure and side wall during the pivoting-forward of the rear door, i.e. it bends as a whole or with variable deformation.

Compared with a thicker, integral design, the multi-layer structure with the upper layer and a lower, possibly multi-strata layer results in no substantially greater material costs, since correspondingly thinner individual layers can be chosen compared with an integral configuration. The possibly curved or concave formation beneath the upper layer is not relevant to aerodynamic properties in this case, as it lies in the slipstream, so to speak, of the aerodynamic flow and can therefore be selectively formed and positioned and adapted to the available space.

The air-guiding element may, in particular, be a roof air-guiding element, the front abutment edge of which adjoins a rear edge of the roof surface or of the vehicle structure adjoining the roof surface, wherein the roof air-guiding element in its longitudinal direction towards the rear may be planar or also curved.

The lower layer may run in the laterally external region in the longitudinal direction, e.g. with a large curvature or concavely curved or also curved in a wavelike manner. The lower layer is preferably only connected to the upper layer in the laterally internal region and is otherwise adjustable in respect of the upper layer, particularly in the longitudinal direction and the direction of the thickness thereof. The gap or cavity between the layers is preferably not sealed and is therefore generally filled with air.

The retracted basic position of the roof air-guiding element is achieved in particular by being positioned flat against the rear door. During the subsequent folding forwards of the rear door, the flexible or deformable external region is in particular also reversibly adapted to the formation in the hinge regions or in the region proximate to the door pivot axis. Consequently, rear door configurations are in particular possible which exhibit hinge designs to support a pivoting action of the door forwardly from the closed position through almost 270°, e.g. roughly 250°, and to facilitate attachment of the rear door to the side wall. Consequently, a rear spoiler design is made possible which allows full functionality in the extended travel position, flat abutment in the basic position with little adjusting work and complete folding-forward of the rear door.

The design of the roof air-guiding element works in a synergistic manner with an adjustment mechanism which not only provides for a folding of the roof air-guiding element about a front pivot axis downwardly, but provides for a pivoting action with temporary longitudinal adjustment of the roof air-guiding element. According to a preferred embodiment, a four-link coupling is provided for this purpose which brings about an adjustment from the retracted basic position by pivoting out towards the rear with subsequent pivoting forwards of the front end of the roof air-guiding element to the vehicle. Consequently, an adjustment device of this kind also allows formations of the front edge or of the front end of the roof air-guiding element which are not possible with pure folding of the roof air-guiding element about a fixed rotational axis.

A four-link coupling of this kind may, for example, be configured with a large and a small linkage which are attached to the rear door in a vertically offset manner, lie flat against the rear door in their basic position and are extended towards the rear in their travel position and therefore offer suitable support to the roof air-guiding element.

Consequently, a rear spoiler device that is cost-effective and can be configured with low vehicle expenditure with secure adjustment between the basic position and the extended position, in particular with forced guidance, and which allows suitable formation of the roof air-guiding element, in order to allow a flat abutment in the retracted basic position too, is facilitated.

BRIEF DESCRIPTION OF THE DRAWING

The invention is described in greater detail below with reference to the accompanying figures, in which:

FIG. 1 shows a truck with a rear spoiler device according to an embodiment in the travel position, as a rear view;

FIG. 2 shows the detail A from FIG. 1;

FIG. 3 shows a perspective view of the right part of the rear spoiler device;

FIG. 4 shows a schematic side view depicting the backflow during travel;

DETAILED DESCRIPTION

Figure 5:
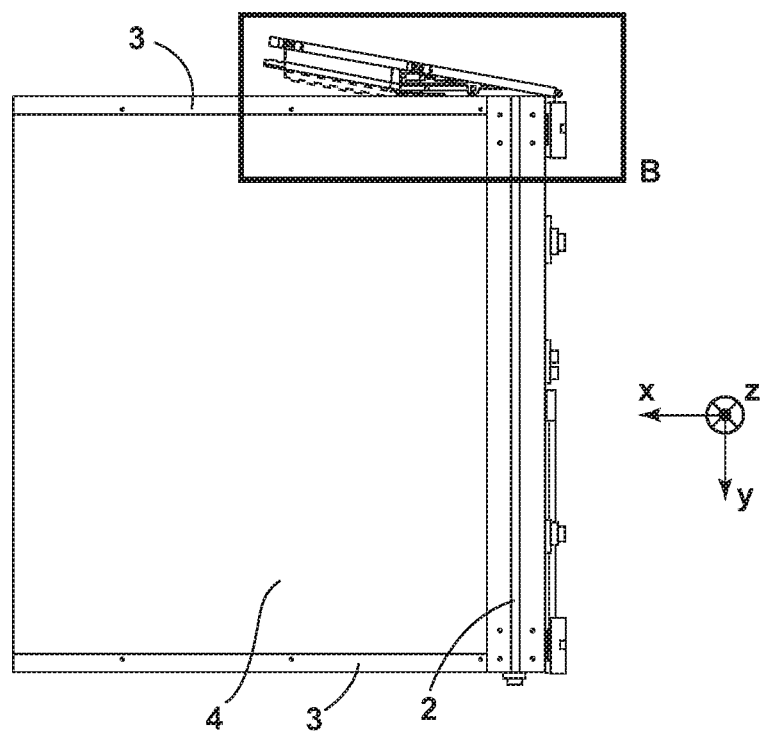
FIG. 5 shows a plan view of the truck with the right rear door folded forwards.

Referring to the Figures, wherein like numerals indicate corresponding parts throughout the several views, a vehicle is generally shown at 1. The vehicle 1, in particular a truck 1, in accordance with FIG. 1 has a vehicle structure 2, two side walls 3, a roof surface 4 and two rear doors 5 which pivot open from the inside outwards. The two rear doors 5 are hinged to the vehicle structure 2 in their laterally external regions or regions external in the transverse direction y (laterally external) via hinges 6, for example, that can be seen from FIG. 6 and they can be pivoted open from the closed position (travel position) that can be seen in FIG. 1 through approximately 250° towards the rear and front, in order to be positioned against the side walls 3 and secured or locked.

A rear spoiler device 8 is fitted to each rear door 5, the spoiler device having a roof air-guiding element 9 for extending the contour of the roof surface 4 towards the rear, i.e. in the x direction, and an adjustment device 10 for adjusting the roof air-guiding element 9 between the travel position shown in FIG. 1 and a basic position folded down. Furthermore, each rear spoiler device 8 typically has a side air-guiding element 19.

The roof air-guiding element 9 is therefore used for the aerodynamic contour extension of the roof surface 4, in particular with a configuration falling away backwardly and downwardly; in this case, the upper side or else the air-guiding surface 9d of the roof air-guiding element 9 in the X direction or longitudinal direction may, in particular, be planar, but it may also have a curved profile, for example.

The roof air-guiding element 9 has an internal region 9a—in respect of the transverse direction y—to which an external region 9b in each case is attached laterally outwards, i.e. towards the side wall 3. The two internal regions 9a of the two roof air-guiding elements 9 therefore bear against one another towards the center of the vehicle; the external regions 9b point towards the side wall 3 in each case.

In the travel position that can be seen in FIGS. 1, 2 and 3, the roof air-guiding element 9 is of planar design having a profile falling away in a straight line towards the rear; its straight front abutment edge 9c therefore directly adjoins a rear roof edge 4a which may be formed by the roof surface 4 or also by the vehicle structure 2. Consequently, the kind of hole or gap 50 between the roof air-guiding element 9 and the vehicle 1 which is depicted in FIG. 4 and is generally disadvantageous in traditional systems is not created, or else a hole of this kind is avoided by a seal, so that there can be no backflow.

In the basic position, the roof air-guiding element 9 lies flat against the rear door 5; adjustment takes place via the adjustment device 10 and may be configured in a variety of ways. On the one hand, the adjustment device 10 may be configured by a pivot axis on the upper end region of the rear door 5, so that the roof air-guiding element 9 is fold-folded up or down for adjustment purposes. Alternatively to this, a four-link coupling may also be provided as the adjustment device 10, for example, which coupling, according to the schematic representation in FIG. 7, pivots the roof air-guiding element between the upper basic position positioned on the rear door 5 and the lower, extended travel position in an arcuate profile, wherein according to the embodiment in FIG. 7, the adjustment device 10 therefore has a long coupler 12 and a short coupler 14 (upper coupler), the distance and length whereof determine the pivot path and also the angle position in the travel position in respect of the roof surface 4.

The roof air-guiding element 9 is locked in its travel position by a first locking device 20 which, for example, may also be a tension/pressure rod 20 used for operation and adjustment, which is coupled to the adjustment device 10, for example, and is secured to the rear door 5 by a securing device 22, e.g. by a tiltable lever.

Figure 7:
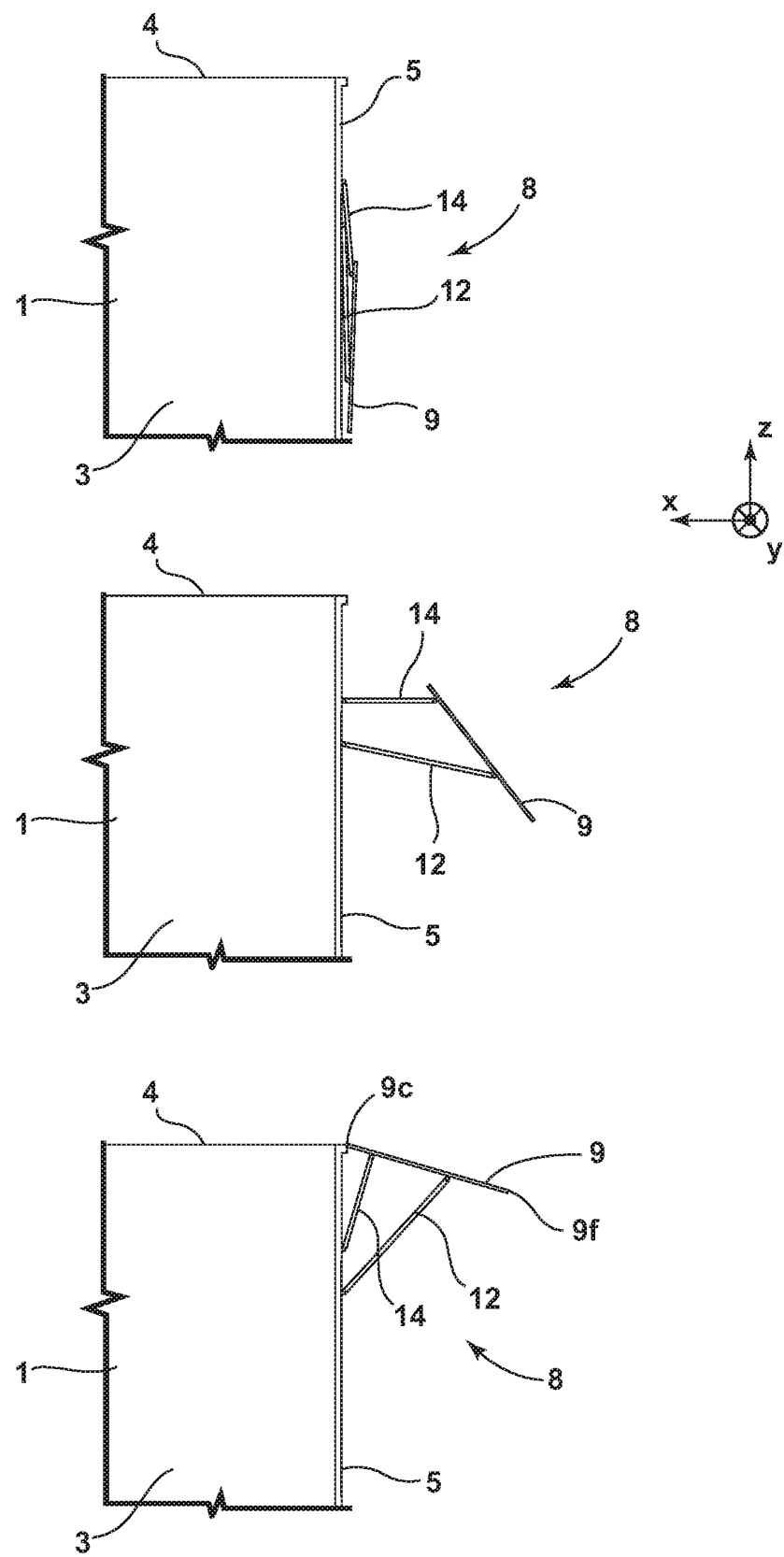
FIG. 7 shows an embodiment of an adjustment device with a four-link coupling in a plurality of positions.

The first locking device 20 in the embodiment in FIG. 7 may be arranged with the four-link coupling directly on the long coupler/linkage 12 or also on the short coupler 14 and may adjust the roof air-guiding element 9 through adjustment of the long lower coupler 12, for example. In the configuration with the pivot axis, the locking device 20 may be directly in contact with the underside of the roof air-guiding element 9 or with an additional lever of a linkage.

The side air-guiding element 19 in turn adjoins with its front edge 19c a rear end of the side wall 3 or of the vehicle structure 2 without a gap, i.e. in a flush-fitting manner. The side air-guiding element 19 can be adjusted via a side adjustment device 29 between the extended travel position shown in FIGS. 1 to 3 and a folded-in basic position, wherein the side adjustment mechanism 29 may be configured in accordance with the adjustment device 10, i.e. either as a single pivot axis or as a four-link coupling. The configuration as a pivot axis is less material-intensive and therefore more cost-effective in principle; in the embodiment with a four-link coupling in accordance with FIG. 7, the side air-guiding element 19 pivots away further from the outer edge and the hinge-hinges 6 of the rear door 5.

Once the side air-guiding element 19 has been unlocked, it can be adjusted by hand, as it is easy to grip in its lower region and, furthermore, no adjustment takes place against gravity.

The hinge 6 of the rear door 5 may be moved slightly forwards in respect of the rear door 5, i.e. positioned in the region of the vehicle structure 2 in the longitudinal direction x in front of the rear door 5; with this kind of design of the rear region of the truck 1, the pivoting action during the opening of the rear door 5 can be improved.

Figure 6:
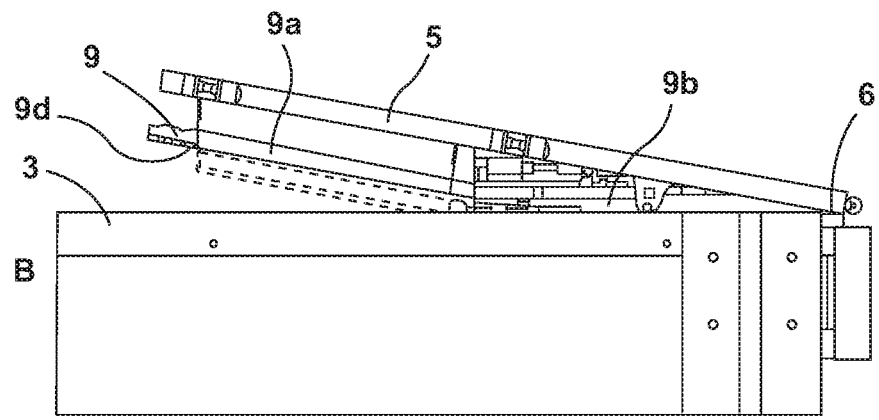
FIG. 6 shows an enlargement of the detail B from FIG. 5.

The roof air-guiding element 9 is flexible or elastic in its external region 9b, so that in the basic position it does not prevent a subsequent pivoting out of the rear door 5 in accordance with FIGS. 5 and 6 in a forward direction for improved access to a loading space in front of the rear doors 5 and for the fixing of the rear door 5 to the side wall 3. The roof air-guiding element 9 is deformed during this forward-pivoting action of the rear door 5 and received between the rear door 5 and the side wall 3. In this case, the external region 9b which comes into abutment with the side wall, in particular, deforms, wherein the external region 9b is pressed towards the rear door 5. The internal region 9a in this case typically furthermore runs parallel to the rear door 5.

Figure 8:
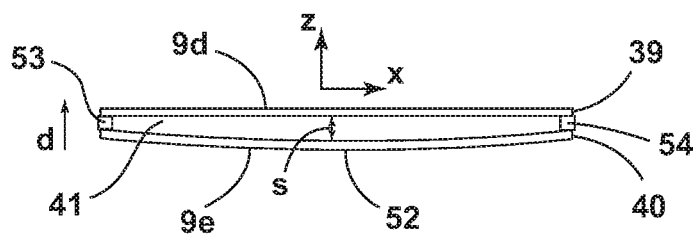
FIG. 8 depicts the laminar structure of the air-guiding element in schematized form.

According to FIG. 8, the roof air-guiding element 9 is of multi-layer design, having an upper layer 39 which therefore forms the guiding surface 9d and at least one lower layer 40; the lower layer 40 may, for example, be formed as a multi-layer configuration or multi-strata configuration. The upper layer 39 is configured in the y extension or transverse extension in respect of the truck 1 in a straight manner and in the x extension, i.e. in the longitudinal direction of the truck 1, in accordance with the desired formation of the roof air-guiding element, i.e. in accordance with the embodiment shown in a straight line in the x direction too, so that the upper layer 39 in this case has a planar or flat configuration. The lower layer 40 is non-planar, i.e. curved, in the x direction or the longitudinal direction; it may be configured in a concave manner, for ex-example, or with a curvature 52 or also in a wavelike manner with a plurality of curvatures 52.

A gap 41 between the layers 39, 40 is not generally sealed; its gap thickness s varies in the longitudinal direction x.

Consequently, a design may in particular be chosen in which the lower layer 40 and the upper layer 39 run in parallel when the rear door 5 is in the folded-down state, i.e. when the roof air-guiding element 9 is reversibly deformed; the formation of the lower layer 40 may therefore be advantageously adapted to the deformation in the folded-down position.

The lower layer 40 therefore has a stiffening effect and acts as a spring or serves to pretension the upper layer 39. Consequently, it stiffens the upper layer 39 on account of the two-layer or multi-layer structure and acts as a resetting spring during deformation. The multi-layer construction with the gap 42 between the lower layer 39 and the upper layer 40 also allows greater deformability or else greater deformation distances; in particular, good deformability can be provided in the external region 9b.

The side air-guiding element 19 may have a correspondingly multi-layered design.

Figure 9:
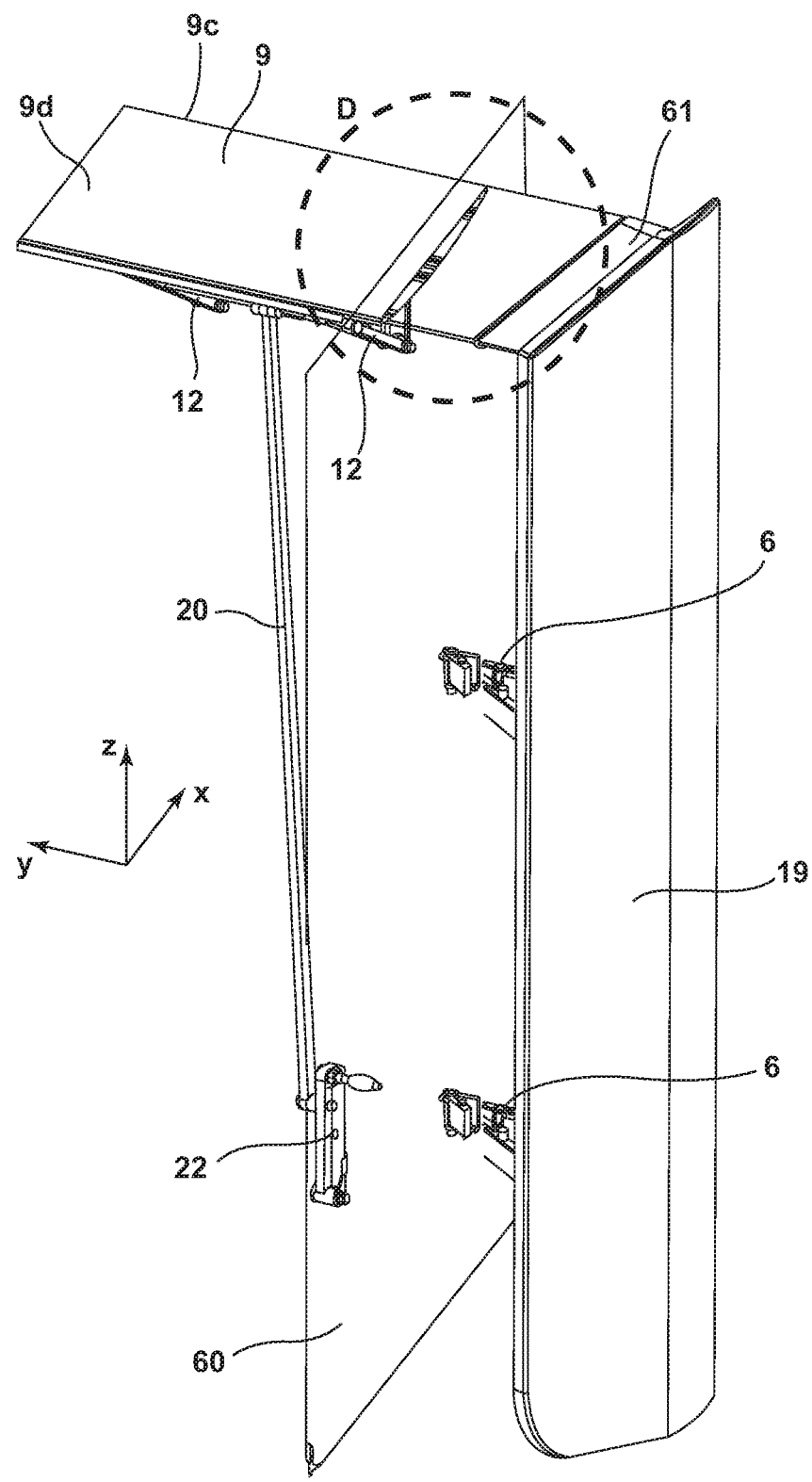
FIG. 9 shows a perspective view of the rear spoiler device in a cross-sectional plane.
Figure 10:
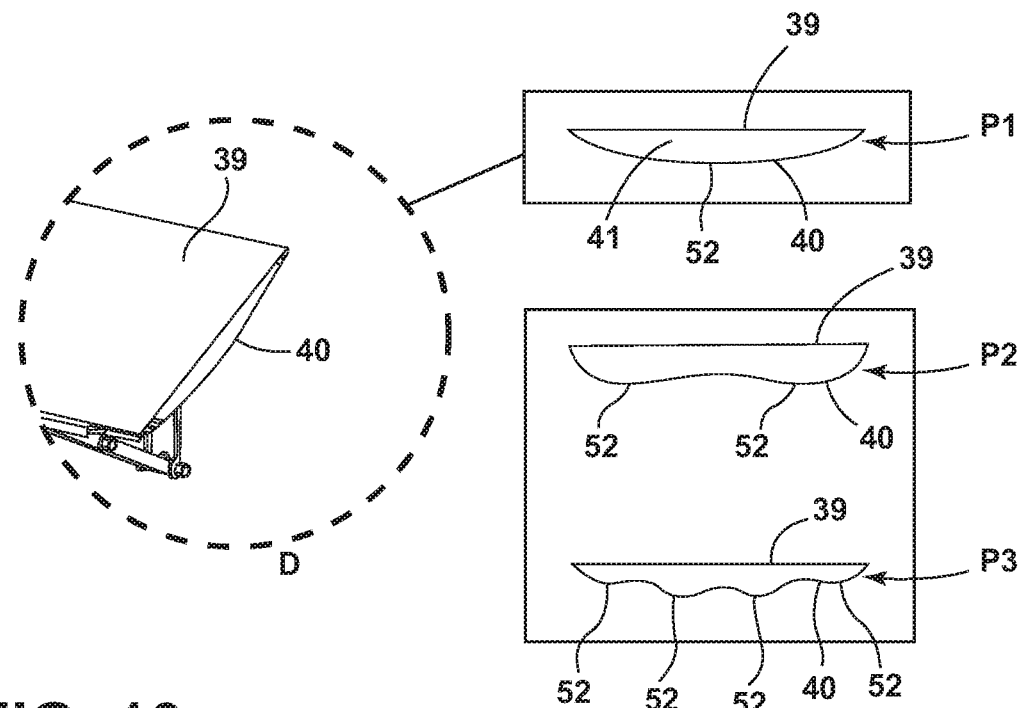
FIG. 10 shows the detail D from FIG. 9 with a plurality of alternative profile configurations.
Figure 11:
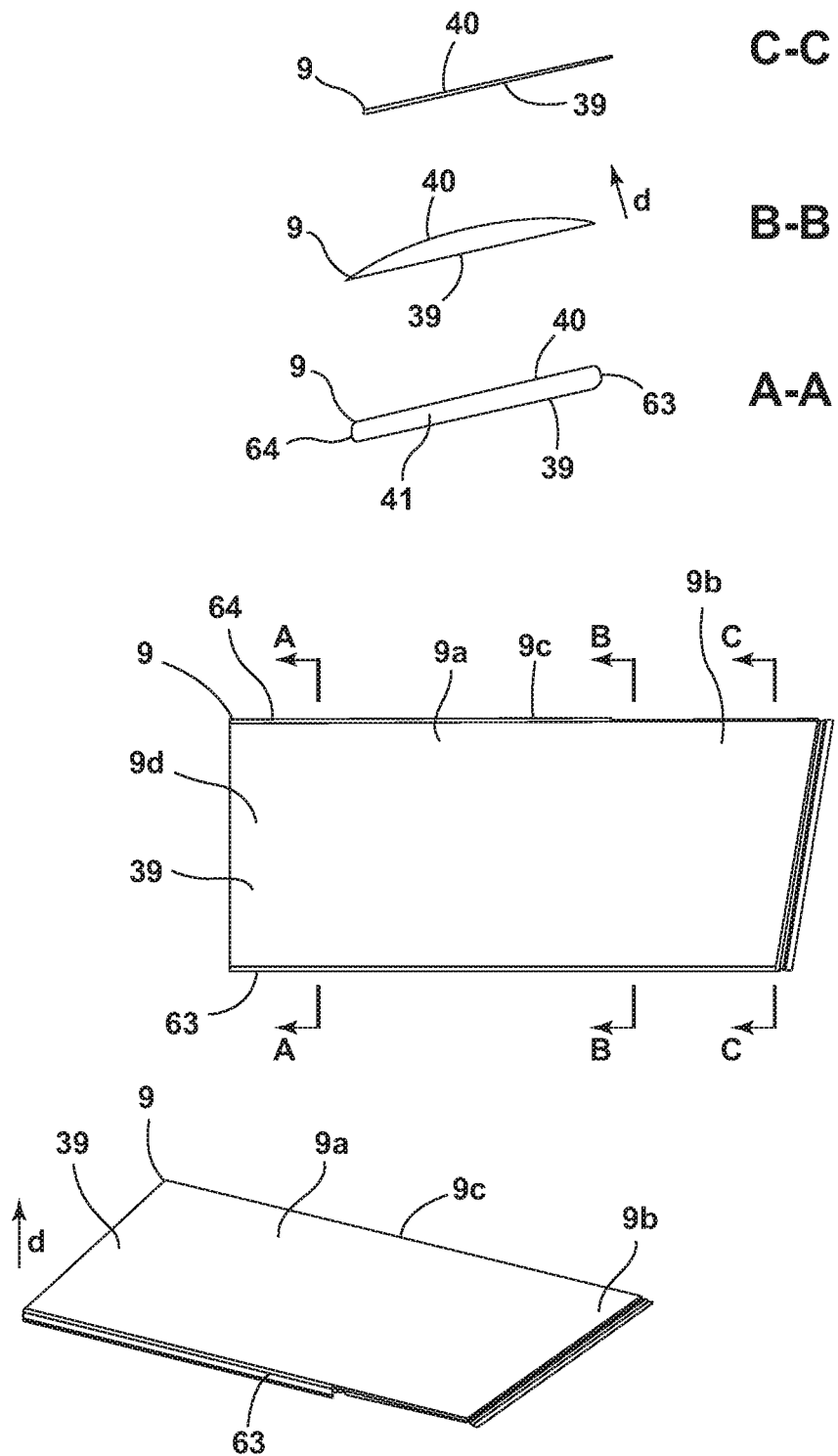
FIG. 11 shows the roof air-guiding element from FIG. 9 with three sections and the profile representations in the sections.

FIG. 9 shows a vertical sectional plane 60, i.e. xz plane, which, as the bending plane, is relevant to the bending behavior of the roof air-guiding element 9, wherein the circular detail D in FIG. 10 is shown in greater detail. This sectional plane corresponds to the section B-B in FIG. 11, wherein FIG. 11 shows three sections A-A, B-B and C-C. In FIG. 9 a seal 61 is attached on the right which, in particular, is also used for abutment to the side air-guiding element 19 and has no further relevance here in terms of functionality; the seal 61 in this case is advantageously fastened to the outer lateral edge of the upper layer 39 and is not further shown in FIG. 11.

The upper layer 39 runs according to FIGS. 9 to 12 over its entire lateral y extension and also in the x direction in a planar manner. In the laterally internal region 9a, the upper layer 39 and the lower layer 40 are connected to one another by, for example, a front strip 64 and a rear strip 63, e.g. bonded and/or framed or else received in a form-fitting manner. Conversely, in the laterally external region 9b, the layers 39, 49 are not connected to one another. The lower layer 40 runs in the internal region 9a parallel to the upper layer 39; in the laterally external region 9b the lower layer 40 is curved in the longitudinal direction x, for example with a curvature 52 according to the profile P1 in FIG. 10, i.e. concavely, or also in a wavelike manner according to profile P2 with two curvatures 52 or according to the profile P3 with four curvatures 52, wherein the curvatures each extend in the direction of the thickness, i.e. in the travel position in the vertical direction z and therefore in the lowered basic position in the longitudinal direction x.

Figure 12:
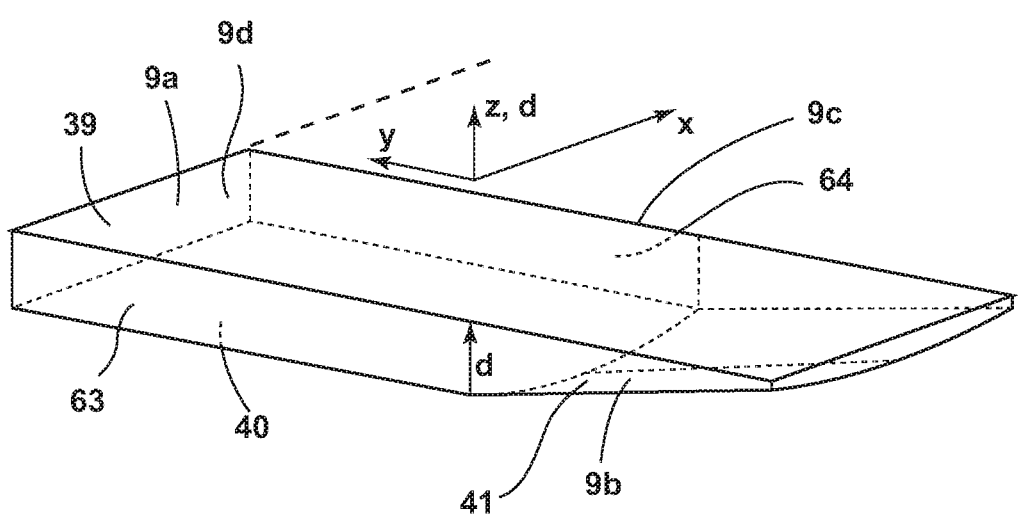
FIG. 12 shows a schematic representation of the vertical profile reduction in FIG. 11.

In the sectional plane B-B, this curved form is therefore easy to identify; laterally, i.e. outwards in the y direction, the thickness d diminishes, i.e. the roof air-guiding element 9 tapers in an outward direction, in that the lower layer 40 runs up to the upper layer 39 according to the schematic representation in FIG. 12.

Consequently, when the rear door 5 is folded forward with the roof air-guiding element 9 positioned in the basic position, the lower layer 40 in the folding plane 60, i.e. in the hinge region, may perform a deformation, in particular fold down, wherein it changes its direction of curvature; changes of this kind are known from bent metal strips, for example, such as tape measures, for example, which possess a stiffness on account of their curvature and can be folded down reversibly against this stiffness in a bending line or bending plane. Because the lower layer 40 in the folding plane 60 is no longer framed at the front and rear, it can expand during bending or folding-down in its longitudinal extension, i.e. balance the dimensional change due to the folding-down from the curved form.

LIST OF REFERENCE NUMBERS

1 Vehicle, truck
2 Vehicle structure
3 Side wall
4 Roof surface
4a Rear roof edge
5 Rear door
6 Hinge
8 Rear spoiler device
9 Roof air-guiding element
10 Adjustment device for adjusting the roof air-guiding element 9
19 Side air-guiding element
9a Internal region
9b External region
9c Front abutment edge
9d Guiding surface
12 Long coupler
14 Short coupler
20 First locking device, compression-tension rod
22 Securing device
29 Side adjustment device for side air-guiding element 19
39 Upper layer
40 Lower layer
41 Gap
50 Gap or space
52 Curvature
60 Folding plane
64 Front strip
63 Rear strip
d Thickness
s Gap thickness
X Longitudinal direction
Y Lateral direction, transverse direction
Z Vertical direction

What is claimed is:

1. A rear spoiler device for a vehicle which has at least one rear door and, as external surfaces, side walls and a roof surface, wherein the rear spoiler device comprises:
a roof air-guiding element which is adjustable between a retracted position and a travel position, the roof air-guiding element including an air-guiding surface to extend the roof surface of the vehicle aerodynamically in the travel position,
wherein the roof air-guiding element has a front abutment edge extending in a lateral direction for attachment or abutment to the roof surface of the vehicle in the travel position,
wherein the rear spoiler device is adapted to be completely fitted to the rear door of the vehicle, the air-guiding element being configured with a multi-layer design with at least one upper layer exhibiting the air-guiding surface and a lower layer spaced apart from the upper layer,
wherein the roof air-guiding element includes, along its lateral dimension, an internal region and an external region, the external region of the roof air-guiding element being elastically reversibly deformable for positioning between the rear door and a side wall of the vehicle when the rear door is pivoted forward, and wherein the lower layer has a curved or arcuate profile in the external region of the roof air-guiding element.

2. The rear spoiler device as claimed in claim 1, wherein the lower layer in the internal region runs substantially parallel to the upper layer.

3. The rear spoiler device as claimed in claim 1, wherein the lower layer in the external region has a curved or arcuate profile in the longitudinal direction.

4. The rear spoiler device as claimed in claim 1, wherein the upper layer and the lower layer are each configured as a planar, continuous material in the lateral direction and the longitudinal direction running from the front abutment edge to the rear edge of the air-guiding element.

5. The rear spoiler device as claimed in claim 1, wherein a gap is formed in the laterally external region between the lower layer and the upper layer, the width whereof varies in the lateral direction.

6. The rear spoiler device as claimed in claim 5, wherein the gap tapers in the outward lateral direction and/or a thickness of the air-guiding element as the distance between the lower layer and the upper layer decreases in the outward lateral direction.

7. The rear spoiler device as claimed in claim 5, wherein the gap is not sealed and is filled with air.

8. The rear spoiler device as claimed in claim 1, wherein the lower layer and the upper layer are connected to one another directly or indirectly in the internal region in their front and rear end in the longitudinal direction in connecting mechanisms.

9. The rear spoiler device as claimed in claim 8, wherein the connecting mechanisms only extend in the internal region.

10. The rear spoiler device as claimed in claim 1, wherein the lower layer is of arcuate or concave design and in precisely one curvature bulges away from the upper layer.

11. The rear spoiler device as claimed in claim 1, wherein the lower layer has a wavelike configuration and bulges away from the upper layer in a plurality of curvatures.

12. The rear spoiler device as claimed in claim 1, wherein the lower layer is configured as a spring device for the elastic resetting of the upper layer.

13. The rear spoiler device as claimed in claim 1, wherein during the deformation of the external region, the upper layer bends down in a planar manner and the lower layer bends down, thereby altering its curvature and producing a spring resetting force.

14. The rear spoiler device as claimed in claim 1, wherein the air-guiding element is adapted to be positioned between the rear door and the side wall in the retracted position with the rear door pivoted forward, lockable to the side wall of the vehicle.

15. The rear spoiler device as claimed in claim 1, wherein the roof air-guiding element is adjustable from the travel position down into the retracted position for abutment against or on the rear door.

16. The rear spoiler device as claimed in claim 1, wherein the air-guiding element is adapted to be bent in the external region relative to the internal region to an underside opposite the air-guiding surface, for abutment against the side wall of the vehicle when the rear door is pivoted forward.

17. The rear spoiler device as claimed in claim 1, further including an adjustment device for adjusting the air-guiding element between the retracted position and the travel position.

18. The rear spoiler device as claimed in claim 17, wherein the adjustment device is configured as a forced guide with only one degree of freedom for the adjustment of the roof air-guiding element between the retracted position and the travel position.

19. The rear spoiler device as claimed in claim 17, wherein the adjustment device is configured as a four-link coupling with four links or joint, at least one large swing arm with a longer length and at least one smaller swing arm with a shorter length, wherein the large swing arm and the small swing arm each have a front link for attaching to a rear door of the vehicle and a rear link for attaching to the air-guiding element.

20. The rear spoiler device as claimed in claim 1, wherein the air-guiding element lies flat on the rear door in the retracted position and/or on the adjustment device lying flat on the rear door.

21. A vehicle comprising:
two side walls,
a roof surface,
two rear doors which open backwards and can be pivoted forwards after opening for abutment and/or locking to the side walls,
a rear spoiler device fastened to each rear door, each rear spoiler device including:
a roof air-guiding element which is adjustable between a retracted basic position and a travel position, the roof air-guiding element including an air-guiding surface to extend the roof surface aerodynamically in the travel position,
wherein the roof air-guiding element defines a front abutment edge extending in a lateral direction for attachment or abutment to the roof surface in the travel position,
wherein the rear spoiler device is fitted to the rear door, the roof air-guiding element including an upper layer defining the air-guiding surface and a lower layer spaced apart from the upper layer,
wherein the roof air-guiding element includes an internal region and an external region each extending in the lateral direction, the external region being elastically reversibly deformable for positioning between the rear door pivoted forward and the side wall, and
wherein the lower layer has a curved or arcuate profile in the external region of the roof air-guiding element.

* * * * *